United States Patent [19]

Tsubouchi et al.

[11] Patent Number: 5,238,547
[45] Date of Patent: Aug. 24, 1993

[54] GAS-LIQUID SEPARATION DEVICE FOR ELECTROCONDUCTIVE GAS-LIQUID TWO PHASE FLOW

[75] Inventors: Kuniyoshi Tsubouchi, Mito; Tsutomu Okusawa, Hitachi; Nobuo Hamano, Tokyo, all of Japan

[73] Assignee: Hitachi, Ltd., Tokyo, Japan

[21] Appl. No.: 455,157

[22] Filed: Dec. 22, 1989

[30] Foreign Application Priority Data

Dec. 23, 1988 [JP] Japan ............... 63-323351

[51] Int. Cl.$^5$ ............................ B01D 19/00
[52] U.S. Cl. ........................... 204/302; 204/186; 210/222; 96/3
[58] Field of Search ............ 204/186, 302, 188, 189, 204/190, 304, 305, 306, 307, 308; 210/222; 55/100

[56] References Cited

U.S. PATENT DOCUMENTS

| | | | |
|---|---|---|---|
| 3,349,354 | 10/1967 | Miyata | 210/222 |
| 3,466,154 | 9/1969 | Hori et al. | 210/222 X |
| 3,719,583 | 3/1973 | Ustick | 204/301 |
| 4,704,139 | 11/1987 | Yamamoto et al. | 55/3 |
| 4,747,925 | 5/1988 | Hasebe et al. | 204/270 |

Primary Examiner—John Niebling
Assistant Examiner—William T. Leader
Attorney, Agent, or Firm—Antonelli, Terry, Stout & Kraus

[57] ABSTRACT

A gas-liquid separation method for electroconductive gas-liquid two phase flow and the device therefor wherein electrodes are disposed in the vicinity of inlet and outlet portions of the gas-liquid separation region in the flow passage of electroconductive gas-liquid two phase flow so as to flow an electric current thereto. A magnet is disposed in the gas-liquid separation region of the flow passage so as to generate a magnetic field perpendicular to the current and to generate an electromagnetic force acting along the flow passage wall on the electroconductive liquid by taking advantage of the Flemming's left hand law, thereby separating the electroconductive gas-liquid two phase flow into gas phase and liquid phase. A hydrophobic porous material having water permeability is employed as the flow passage wall in the gas-liquid separation region; the gas-liquid separation region is disposed in a reduced pressure region; and the separated gas phase is effectively removed out of the flow passage.

2 Claims, 4 Drawing Sheets

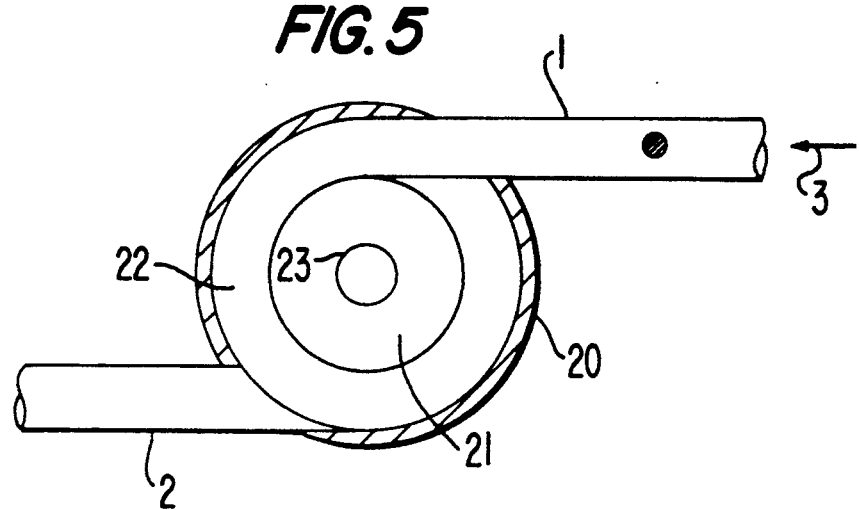
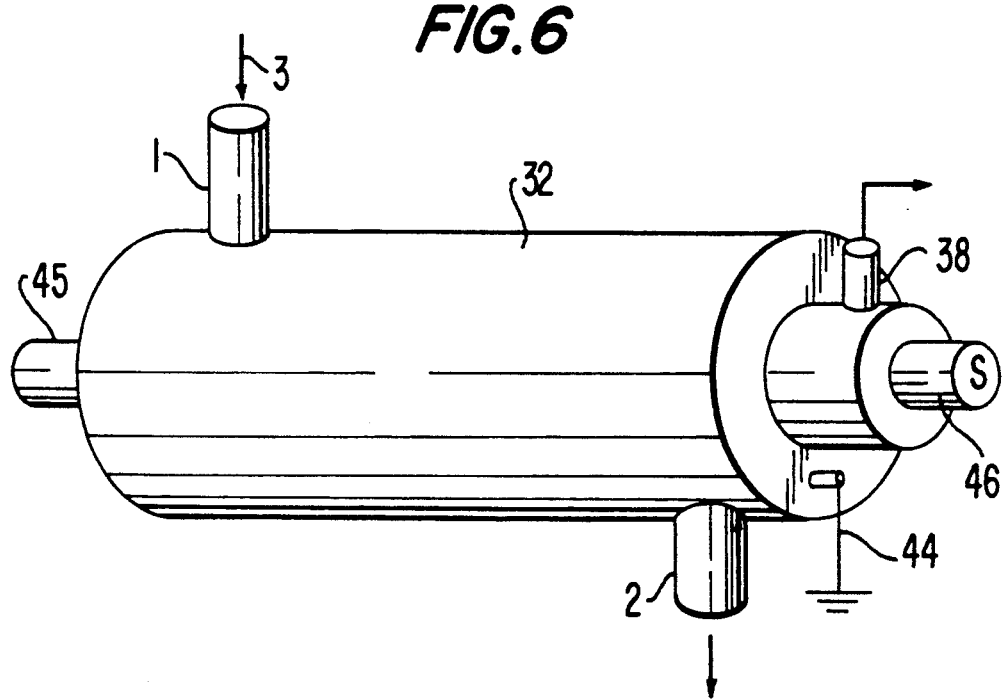

GAS-LIQUID SEPARATION DEVICE FOR ELECTROCONDUCTIVE GAS-LIQUID TWO PHASE FLOW

BACKGROUND OF THE INVENTION

The present invention relates to a gas-liquid separation method for electroconductive gas-liquid two phase flow and the device therefor and, in particular, relates to a separation method for electroconductive gas-liquid and the device therefor suitable for separating and removing the gas phase from gas-liquid two phase flow under a microgravity environment.

Generally, in an analysis device and a separation and purification device relating to bioscience, when gas bubbles are contained in a sample, volume variation becomes sometimes large due to compressibility, and channeling of flow in a flow passage sometimes occurs due to the gas bubbles and the performance of the devices extremely deteriorates. As conventional contermeasures, such as proposed in Japanese Patent Application Laid-Open Nos. 55-121806 (1980) and 62-180711 (1987), were employed devices wherein the flow passage wall and the tube passage were formed by using a hydrophobic porous material having water permeability, flow passages were disposed in a reduced pressure chamber and the gas bubbles contained in the liquid phase were degased. However, in these gas-liquid separation methods, measures were taken such as prolonging the flow passage length for increasing gas separation efficiency and reducing the flow passage cross sectional area for increasing contact area of the gas bubbles with the flow passage wall, so that there arised problems of prolongation of the flow passage length and the increasing flow passage resistance.

Moreover, in a microgravity environment, such as in space, where the effect of separation action with the gravity can not be expected, the separation of the gas-liquid two phase flows is rendered difficult. Further, surface tension is dominant there, so that the combination of the respective bubbles becomes difficult and the contacting area to the gas permeable membrane reduces such that the separation efficiency deteriorates. In such microgravity environment, by forming the flow passage in coils or by disposing swirling vanes in the flow passages, swirling components are provided in the flow of the sample and the gas-liquid two phase flow is separated in many cases by the action of centrifugal force. However, such as in devices relating to bioscience dealing with expensive physiological active material where a sample of trace quantity of flow rate is handled, generation of the swirl components by the flow of sample itself is difficult. On the other hand, in the method of disposing the vane wheel in the flow passage and forcedly generating the swirling components, there exist many problems such as sealing, lubrication and biological contamination.

Examples of separation devices for gas-liquid two phase flows effective under such microgravity environment were proposed in Japanese Patent Application Laid-Open Nos. 58-88012 (1983) and 58-88013 (1983) wherein electrodes in ring shape and the like are disposed along the flow passage of electrical insulation gas-liquid two phase flow, a high electric field region and a low electric field region are formed and the gas phase in the electrical insulation gas-liquid two phase flow is collected.

However, these devices are considered effective for gas-liquid two phase flows having an electrical insulation property; since these devices use a high voltage, there are many of problems with respect to e.g., electrolysis of sample and current leakage when applied to the cases where the electroconductive gas-liquid two phase flows are the subject for separation as in the devices relating to bioscience.

SUMMARY OF THE INVENTION

An object of the present invention is to provide a gas-liquid separation method for electroconductive gas-liquid two phase flow and the device therefor which carries out a stable gas-liquid separation even under conditions such as a microgravity environment and trace quantity of flow rate.

One aspect of the present invention is characterized by disposing electrodes in the vicinity of the inlet and outlet portions of the gas-liquid separation region in the flow passage of the electroconductive gas-liquid two phase flow so as to flow electric current therebetween; disposing a magnet in the gas-liquid separation region of the flow passage so that the magnetic field acts perpendicular to the current; directing an electromagnetic force along the flow passage wall on the electroconductive liquid by taking advantage of Flemming's left hand law; and separating between gas phase and liquid phase from the electroconductive gas-liquid two phase flow.

Another aspect of the present invention is characterized by disposing electrodes in the vicinity of the inlet and outlet portions of the gas-liquid separation region in the flow passage of the electroconductive gas-liquid two phase flow so as to flow electric current therebetween; disposing a magnet in the gas-liquid separation region of the flow passage so as to that the magnetic field acts perpendicular to the current; directing an electromagnetic force along the flow passage wall on the electroconductive liquid by taking advantage of the Flemming's left hand law; and separating between gas phase and liquid phase from the electroconductive gas-liquid two phase flow; further, employing a hydrophobic porous material having water permeability as the flow passage wall in the gas-liquid separation region; disposing the gas-liquid separation region in a reduced pressure region; and removing effectively the separated gas phase out of the flow passage.

BRIEF DESCRIPTION OF THE DRAWINGS

FIG. 5 is cross sectional view along line V—V in FIG. 4;

FIG. 6 is a perspective view of the third embodiment according to the present invention;

DETAILED DESCRIPTION OF THE PREFERRED EMBODIMENTS

Hereinafter the gas-liquid separation device for electroconductive gas-liquid two phase flow according to one embodiment of the present invention will be explained with referrence to FIG. 1 and FIG. 2.

Figure 1:
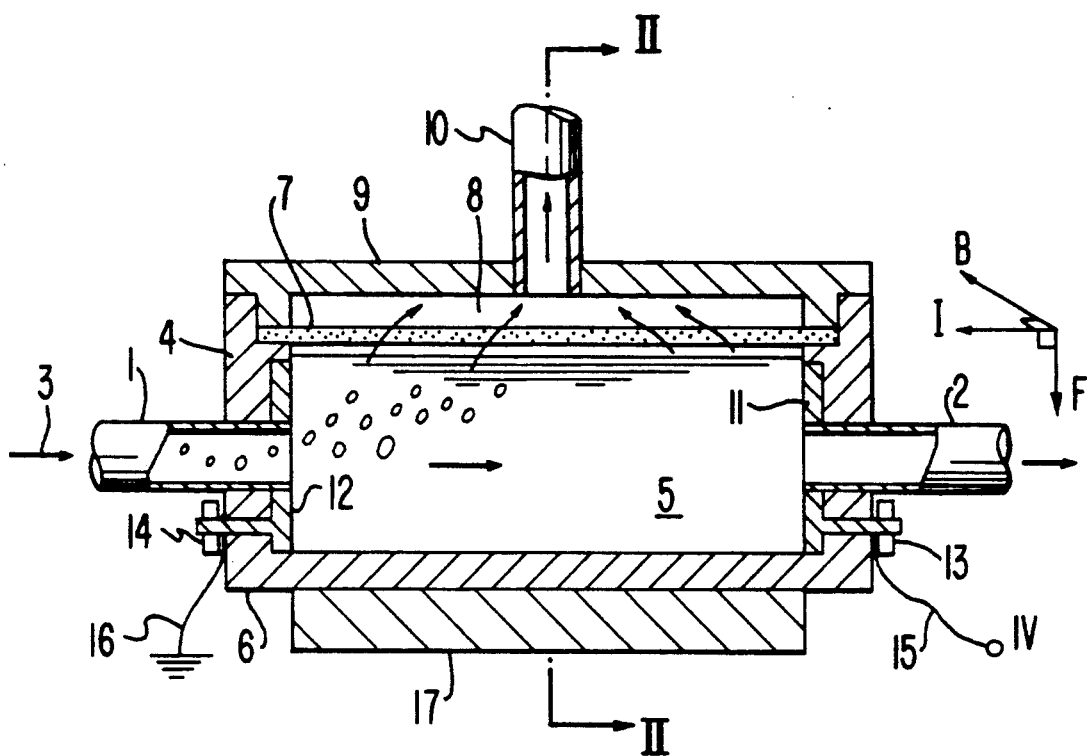
FIG. 1 is a cross sectional view of a gas-liquid separation device for electroconductive gas-liquid two phase flows according to the first embodiment of the present invention.

As shown in FIG. 1, the present embodiment shows an example wherein a gas-liquid separation device 4 is provided in a part of the flow passage of gas-liquid two phase flow. A separation chamber 6 is provided which contains an electroconductive gas-liquid two phase flow 3 therein and constitues gas-liquid separation region 5. To this separation chamber 6 a gas-liquid two phase flow tube 1 for charging the gas-liquid two phase flow 15 and a liquid phase discharging tube 2 for discharging the liquid phase after separation are connected. Above this separation chamber 6 a hydrophobic membrane 7 of fluorocarbon system having gas permeability is disposed, and a reduced pressure chamber 8 is formed outside the hydrophobic membrane 7 with a cover member 9. A gas phase discharge tube 10 is provided at a part of this cover member 9, and the above mentioned reduced pressure chamber 8 is connected to a pressure reducing device (not shown), such as a vacuum pump.

In such gas-liquid separation device 4 of the present embodiment, a high voltage side electrode 11 and a low voltage side electrode 12 are respectively provided on the opposing inner wall faces of the separation chamber 6 as well as connected to outer power supply 15 and to the ground 16 through electrode terminals 13 and 14. Although, in the present embodiment, the high voltage side electrode 11 is disposed on the inner wall of the separation chamber 6 where the liquid phase discharge tube 2 is connected, and the ground side electrode 12 is on the inner wall of the separation chamber 6 where the gas-liquid two phase tube 1 is connected, the present invention is not limited to this disposition and such is determined in consideration of e.g., the flow direction of the gas-liquid two phase flow and acting direction of the electromagnetic force.

On one hand, adjacent to the outer wall face of the separation chamber 6 in the gas-liquid separation device 4, a magnet 17 is disposed so that magnetic field acts toward the direction perpendicular to the line connecting the above pair of opposing electrodes 11 and 12.

Figure 2:
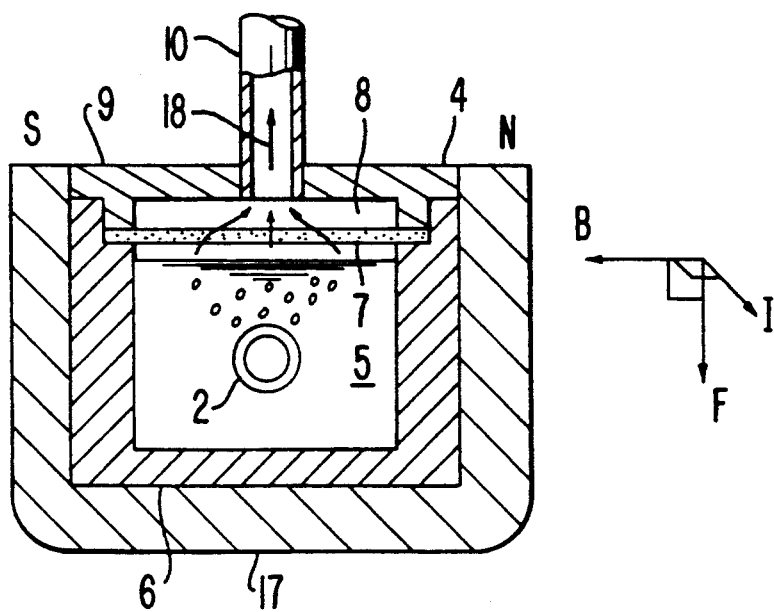
FIG. 2 is a cross sectional view along line II—II in FIG. 2.

As the constitutional example shown in FIG. 2 which is a cross section along the line II—II in FIG. 1, in the present embodiment, the magnetic field generated with the N and S poles of the magnet 17 crosses perpendicularly to with the pair of electrodes 11 and 12. In addition, the N and S poles are disposed so as to cross perpendicularly to the flow direction of gas phase 18 in the gas-liquid separation device 4 from the gas-liquid separation region 5 to the reduced pressure chamber 8 through the hydrophobic membrane 7 having gas permeability.

Figure 3:
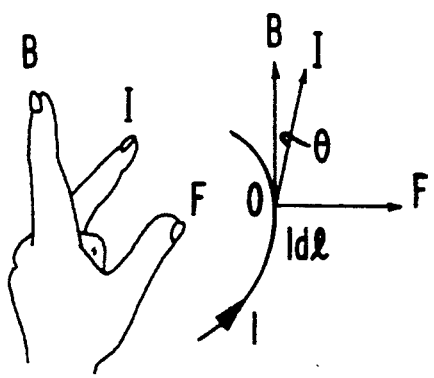
FIG. 3 is an explanatory view illustrating acting direction of electromagnetic force.

In the gas-liquid separation device 4 thus constituted, when the electroconductive gas-liquid two phase flow 3 is introduced into the gas-liquid separation region 5 in the separation chamber 6 through the gas-liquid two phase tube 1 and the external power supply voltage 15 is applied to the pair of electrodes disposed on the inner wall of the separation chamber 6 through the terminals 13 and 14, current flows through the liquid in the gas-liquid separation region 5. On one hand, N and S poles of the magnet 17 are arranged to cross in perpendicularly to the direction of the current, thereby the magnetic field acts on the current to cross perpendicularly. When there is a current flowing conductor in the magnegic field, an electromagnetic field acts on the conductor. The direction thereof, as shown in FIG. 3, is determined by Flemming's left hand law. That is, when the current I and the magnetic field B act in the directions shown in FIG. 3, the electromagnetic force F acts in the direction also shown in FIG. 3. The force is expressed as follows;

$$dF = BI \sin\theta \, dl$$

Where
$\theta$: Angle between the current I and magnetic field
dl: Extremely short length of the conductor Therefore, with the embodiment of FIG. 1 and FIG. 2, in the separation chamber 6, the current I flows from the downstream side to the upstream side along the axial flow direction of the electroconductive gas-liquid two phase flows, the magnetic field is formed in a direction perpendicular to the sheet of FIG. 1 from up to down, in other words, from N pole to S pole as shown in FIG. 2; therefore, to the electroconductive liquid as a conductor is applied an electromagnetic force F directing to the inner wall face of the separation chamber opposing to the hydrophobic membrane having gas permeability as shown in the drawings. That is, among the gas-liquid two phase flow including many bubbles, only the liquid having electroconductivity, with the action of the electromagnetic force F, gradually drifts to the direction opposite to the hydrophobic membrane 7, therefore as a matter of course, the bubbles therein drift toward the hydrophobic membrane 7 and the gas phase and the liquid phase are separated. As will be understood, the gas phase is separatedly collected in the vicinity of the hydrophobic membrane 7 having gas permeability, when the internal pressure of the reduced pressure chamber adjacent to the opposite side of the hydrophobic membrane 7 is decreased; that is, the gas phase passes through the microscopic holes of the hydrophobic membrane 7 into the reduced pressure chamber 8 and is removed out of the system through the gas phase discharge tube 10. On one hand, the electroconductive liquid remaining in the separation chamber 6 is rendered to a liquid phase without bubbles and flows down to the liquid discharge tube 2.

Figure 4:
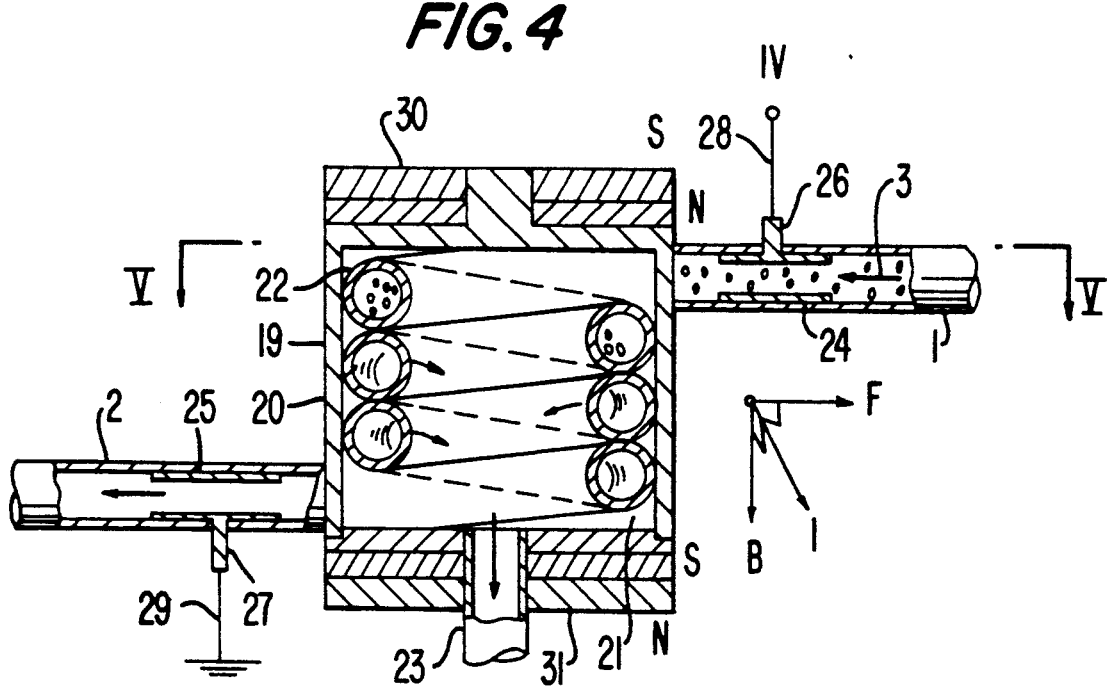
FIG. 4 is a cross sectional view of the second embodiment according to the present invention.

FIG. 4 and FIG. 5 show a gas-liquid separation device for electroconductive gas-liquid two phase flows according to the second embodiment of the present invention. In the embodiment shown, the gas-liquid separation device 19 is provided with a separation chamber 20 of a cylindrical shape of which both ends are tightly closed, and, in the inner space 21 thereof, a coiled gas-liquid separation tube 22 formed of a hydrophobic membrane material having gas permeability is disposed, and is connected to the gas-liquid two phase tube 1 introducing the gas-liquid two phase flow 3 and to the liquid phase discharge tube 2. On one hand, a gas phase discharge tube 23 is provided at one end face of the separation chamber 20 and is communicated with the inner space 21 which is constituted to be in a reduced pressure In such gas-liquid separation device 19 too, a pair of electrodes 24 and 25 are provided at the inside of the gas-liquid two phase the 1 for the flow-in side and at the inside of the liquid phase discharge tube 2 for the flowout side, as well as are connected to a high voltage side power supply 28 and the ground 29 through respective terminals 26 and 27. Further, magnets 30 and 31 are provided on the both end faces of the cylindrical separation chamber 20 and N and S poles are disposes so as to oppose each other and to create a magnetic field.

With the gas-liquid separation device 19 of the present embodiment, the electroconductive gas-liquid two phase flow 3 flows into the gas-liquid separation tube 22 from the gas-liquid two phase tube 1, flows down inside the coiled gas-liquid separation tube 22 in the separation chamber 20 and is effected more or less by an action of centrifugal force. Further, with the pair of electrodes disposed at the inlet and outlet portions of the flow passage current I flows through the electroconductive liquid and with the magnets 30 and 31 provided at the both ends of the separation chamber in opposing relation magnetic field B is formed in the axial direction of the cylindrical separation chamber 20. Therefore, the electroconductive liquid in the coiled gas-liquid separation tube 22 is forced toward the outer circumferential side by the effect of the electromagnetic force F, thereby, the included bubbles are concentrated toward the inner circumferential side. Thus the gas-liquid two phase flow is gradually separated into gas phase and liquid phase. Further, in the present embodiment, since the gas-liquid separation tube 22 is formed of a hydrophobic membrane having gas permeability, when the internal space 21 of the separation chamber 20 is rendered under a reduced pressure condition, only the gas phase collected in the inner circumferential side of the gas-liquid separation tube 22 passes through the tube wall into the internal space 21 and is separated and removed out of the system through the communicating gas phase discharge tube 23. Particularly with the present embodiment, by the constitution of the coiled gas-liquid separation tube 22 in addition to the electromagnetic force F, a centrifugal force acts on the internal liquid, due to their multiplier effect, a separation efficiency equal to or more than that of the first embodiment is obtained with the present embodiment.

Figure 7:
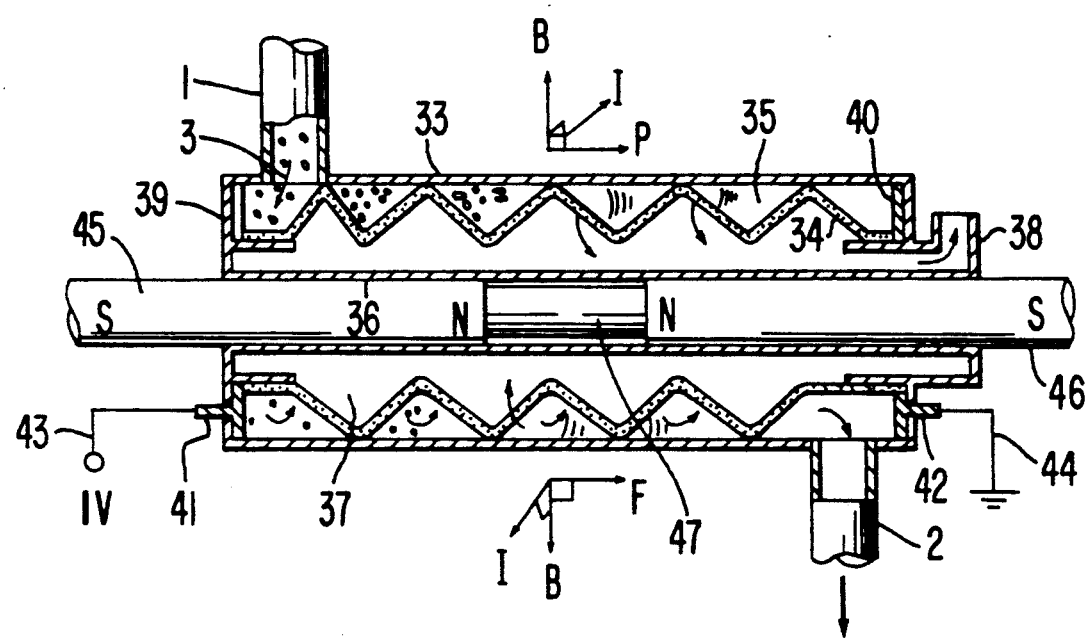
FIG. 7 is a cross sectional view of FIG. 6.
Figure 8:
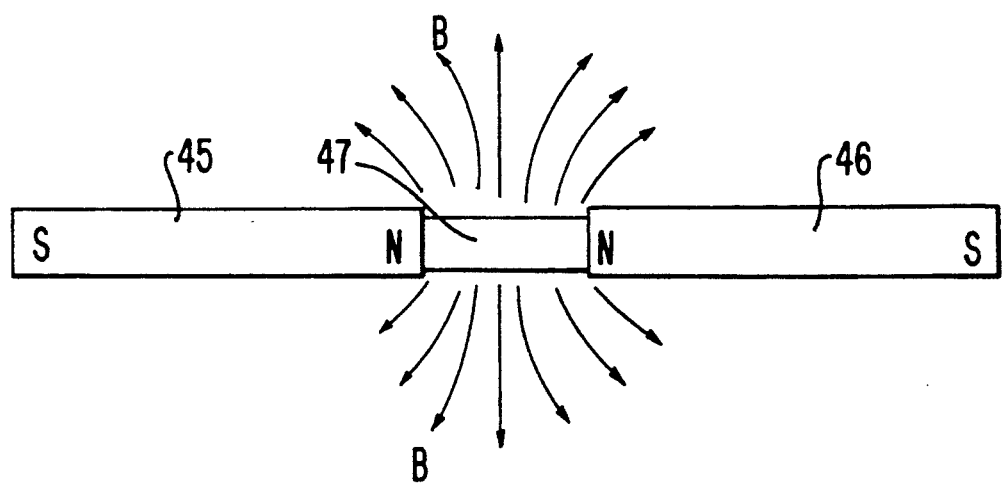
FIG. 8 is an explanatory view illustrating magnetic field vectors.

FIG. 6 and FIG. 7 show a gas-liquid separation device for electroconductive two phase flows according to the third embodiment of the present invention. The gas-liquid separation device 32 of the present embodiment shown in the FIGS. 6 and 7 is elongated along the axial direction and includes a doubled cylindrical shape separation chamber 33, in the inner space of which a spiral shaped gas-liquid separation flow passage 35 for passing the gas-liquid two phase flow is disposed and is formed by using a hydrophobic membrane 34 having gas permeability. Further, in the inner circumferential side thereof, which is surrounded by the hydrophobic membrane 34 and a cylinder wall 36, a reduced pressure chamber 37 is formed, and at one end face thereof a gas phase discharge tube 38 is communicatively disposed. On one hand, the gas-liquid separation flow passage 35 formed at the outer circumferential side of the hydrophobic membrane 34 communicates with the gas-liquid two phase tube 1 in the vicinity of one axial end of the cylindrical separation chamber 33 as well as with the liquid phase discharge tube 2 in the vicinity of the other axial end of the separation chamber. Further a pair of electrodes 39 and 40 are provided on the respective inner wall sides of both axial ends of the separation chamber 33 in the portion where the gas-liquid separation flow passage contacts as well as are connected to, respectively, an external high voltage side power supply 43 and the ground 44 through terminals 41 and 42. On one hand, as a method for generating magnetic field, which is different from those of the previous embodiments, rod shaped magnets 45 and 46 are inserted into the axial center portion of the gas-liquid separation device 32 and arranged to face the respective N poles of the magnets through a cylinder 47 of soft steel. By the employment of such magnet arrangement, the magnetic field B causes the magnetic flux to act in a radial direction from the axial center portion as shown in FIG. 8, and the radial magnetic fieled vector acts on the separation flow passage 35 of the present embodiment in the radial direction from the axial center portion. As a result, when current I flows in the electroconductive gas-liquid two phase flow 3 passing through the spirally constituted gas-liquid separation flow passage 35, as shown in FIG. 7 the electromagnetic force F acts on the liquid phase in the axial direction and the gas phase and the liquid phase are gradually separated. In the above mentioned second embodiment, when the gas-liquid separation tube passage is elongated, the distance between the magnets becomes large and the magnetic field vector tends to be rendered weak; however, with the present embodiment, the strength of magnetic field vector does not substantially change even if the separation flow passage is enlarged, and therefore, it is expected to maximize gas-liquid separation capability by the electromagnetic force. Althouth, in the present embodiment, the spiral separation flow passage 35 is constituted with the hydrophobic membrane 34, a separation tube of hydrophobic membrane may of course be constituted in a coil shape like the previous embodiments.

Further, although in the above embodiments, magnets (permanent or electromagnets) are employed as an magnetic field generating device, when a superconductive magnet is employed, the magnetic field vector can be increased and the electromagnetic force also increased such that the gas-liquid separation is possibly carried out in a short time.

According to the respective embodiments of the present invention, even in cases when an electroconductive sample including mixed gas and liquid, such as expensive physiological active material, is treated, where generation of swirl components by the flow of the sample itself is difficult due to trace quantity of the flow rate or microgravity environment such as in space, and, thus gas-liquid separation is difficult, by flowing current in the gas-liquid two phase flow and generating a magnetic field, a strong electro-magnetic force is actable on the liquid phase as conductor, and the separation between gas phase and liquid phase can be easily achieved. Further since no movable parts are included in the internal flow passage, the structure thereof is simplified and a clean and reliable gas-liquid separation device for biological materials sensitive to contamination is obtainable. In addition, although data will differ depending upon the specific structure of the separation device, in the structure of the third embodiment, when a permanent magnet of 20K gauss and current of $0.25A/cm^2$ were employed, it was determined that a electromagnetic force corresponding to at least acceleration of several 10 g was obtained.

According to the gas-liquid separation method for electroconductive gas-liquid two phase flows and the device therefor of the present invention explained above, the electrodes are disposed in the vicinity of the inlet and outlet portions of the gas-liquid separation region in the flow passage of electroconductive gas-liquid two phase flow so as to flow electric current therebetween; the magnet is disposed in the gas-liquid separation region of the flow passage so that the magnetic field act perpendicularly to the current; an electromagnetic force along the flow passage wall acts on the electroconductive liquid by taking advantage of Flemming's left hand law; and the gas phase and the liquid phase are separated from the electroconductive gas-liquid two phase flow, so that even in a microgravity emvironment and in a trace quantity flow rate condition, a gas-liquid separation method for electroconductive gas-liquid two phase flow and the device therefor capable of a stable gas-liquid separation is obtained.

We claim:

1. A gas-liquid separation device for electroconductive gas-liquid two phase flow, comprising inner and outer cylinders, one arranged within the other defining a separation chamber in an annular region between the cylinders, both ends of the separation chamber being tightly closed by a pair of axial end members; a spiral shaped gas-liquid separation flow passage in said annular region formed by using a hydrophobic membrane having gas permeability for passing the electroconductive gas-liquid two phase flow; a reduced pressure chamber in said annular region formed on an inner circumferential side of said gas-liquid separation flow passage and surrounded with said hydrophobic membrane, the inner cylindrical wall of said separation chamber and the pair of axial end members; a gas discharge tube connected to one axial end member of said pressure reduced chamber for discharging the gas phase separated; a gas-liquid two phase tube connected to the flow passage near one end of said separation chamber for introducing the electroconductive gas-liquid two phase flow into said gas-liquid separation flow passage; a liquid phase discharge tube connected to the flow passage near the other end of said separation chamber for discharging the liquid phase after the gas is separated in said gas-liquid separation flow passage; a pair of electrodes, each of said pair of electrodes being disposed on the inner wall side of an axial end member of said separation chamber and in the portion contacting to said gas-liquid separation flow passage; at least two magnets disposed along the central axis of the inner cylinder so that the same polarities thereof face each other and generate a radial magnetic field in the radial direction from the central axis.

2. A gas-liquid separation device for electroconductive gas-liquid two phase flow comprising inner and outer cylinders defining a separation chamber in an annular region between the cylinders, both ends of the separation chamber being tightly closed by a pair of axial end members; a coiled gas-liquid separation tube in the annular region formed by using a hydrophobic membrane material having gas permeability for passing the electroconductive gas-liquid two phase flow; a reduced pressure chamber in the annular region formed on an inner circumferential side of said coiled gas-liquid separation tube and surrounded with said hydrophobic membrane material, the inner cylindrical wall of said separation chamber and the pair of axial end members; a gas discharge tube connected to one axial end member of said pressure reduced chamber for discharging the gas phase separated; a gas-liquid two phase tube connected to the separation tube near one end of said separation chamber for introducing the electroconductive gas-liquid two phase flow into said cooled gas-liquid separation tube; a liquid phase discharge tube connected to the separation tube near the other end side of said separation chamber for discharging the liquid phase after the gas is separated in said coiled gas-liquid separation tube; a pair of electrodes, each of said pair of electrodes being disposed at an end of said separation chamber and being adapted to contact with the gas-liquid two phase flow; at least two magnets disposed along the central axis of the inner cylinder so that the same polarities thereof face each other and generate a radial magnetic field in the radial direction from the central axis.

* * * * *